United States Patent
Cheng et al.

(10) Patent No.: US 10,252,465 B2
(45) Date of Patent: Apr. 9, 2019

(54) 3-DIMENSIONAL PRINTING APPARATUS AND DISPENSING DEVICE

(71) Applicant: SONY CORPORATION, Tokyo (JP)

(72) Inventors: Yih-Lin Cheng, Taipei (TW); Freeman Chen, Taipei (TW); Yu-Kai Yang, Taipei (TW)

(73) Assignee: SONY CORPORATION, Tokyo (JP)

( * ) Notice: Subject to any disclaimer, the term of this patent is extended or adjusted under 35 U.S.C. 154(b) by 160 days.

(21) Appl. No.: 15/211,202

(22) Filed: Jul. 15, 2016

(65) Prior Publication Data
US 2018/0015659 A1 Jan. 18, 2018

(51) Int. Cl.
| | |
|---|---|
| *B29C 64/295* | (2017.01) |
| *B33Y 10/00* | (2015.01) |
| *B33Y 30/00* | (2015.01) |
| *B29C 64/386* | (2017.01) |
| *B29C 64/209* | (2017.01) |
| *B29C 64/106* | (2017.01) |
| *B29C 64/118* | (2017.01) |

(52) U.S. Cl.
CPC .......... *B29C 64/295* (2017.08); *B29C 64/106* (2017.08); *B29C 64/209* (2017.08); *B29C 64/386* (2017.08); *B33Y 10/00* (2014.12); *B33Y 30/00* (2014.12); *B29C 64/118* (2017.08)

(58) Field of Classification Search
CPC .... B29C 64/106; B29C 64/295; B29C 64/209
See application file for complete search history.

(56) References Cited

U.S. PATENT DOCUMENTS

| | | | | |
|---|---|---|---|---|
| 2,547,151 A | * | 4/1951 | Braeseke | B29C 47/361 366/81 |
| 2004/0256382 A1 | * | 12/2004 | Pilavdzic | B29C 47/822 219/601 |
| 2013/0241102 A1 | * | 9/2013 | Rodgers | B29C 47/0014 264/132 |
| 2014/0287139 A1 | * | 9/2014 | Farmer | B29C 64/393 427/212 |
| 2017/0008230 A1 | * | 1/2017 | Yuyama | B29C 64/106 |

FOREIGN PATENT DOCUMENTS

| | | | |
|---|---|---|---|
| JP | 2015-168135 A | 9/2015 | |
| WO | 2015/009938 A1 | 1/2015 | |
| WO | WO-2015129733 A1 * | 9/2015 | ........... B29C 64/106 |
| WO | 2016/102669 A1 | 6/2016 | |

OTHER PUBLICATIONS

International Search Report of PCT Application No. PCT/JP2017/019048, dated Jun. 20, 2017, 04 pages of English Translation and 03 pages of ISR.

* cited by examiner

*Primary Examiner* — Timothy Kennedy

(74) *Attorney, Agent, or Firm* — Chip Law Group

(57) ABSTRACT

The present disclosure provides a dispensing device and a 3-D printing apparatus including the same. The dispensing device comprises a main body with a main body heater, a head portion and a heating device. The main body includes a passage with a longitudinal axis and the main body heater is used for heating the material in at least a section of the passage to a flowable condition. The head portion is connected to an end of the passage and communicates with the passage and further includes an outlet for discharging the heated material. The heating device includes a peripheral path surrounding the head portion and heats a region surrounded by the peripheral path.

16 Claims, 8 Drawing Sheets

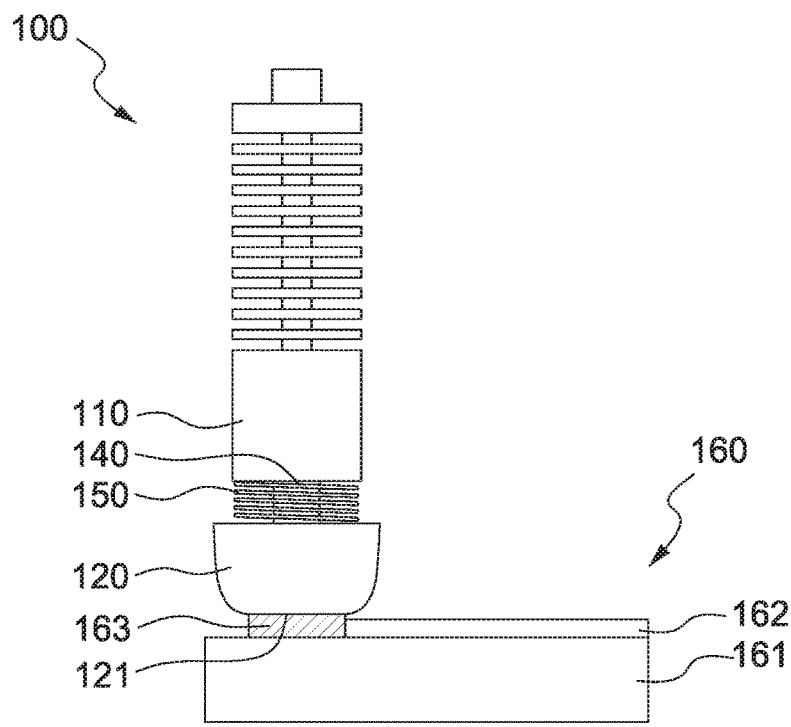
FIG. 3
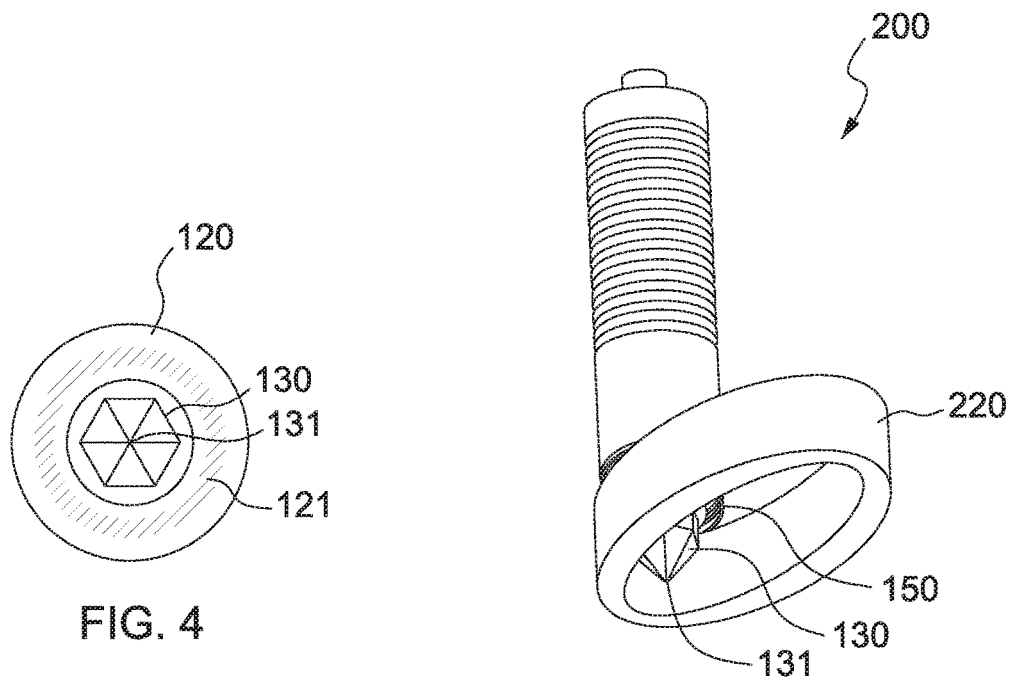
FIG. 4
FIG. 5

3-DIMENSIONAL PRINTING APPARATUS AND DISPENSING DEVICE

TECHNICAL FIELD

The present disclosure relates to a 3-dimensional (3-D) printing apparatus, especially to a dispensing device of the 3-D printing apparatus having a localized heating device for achieving an appropriate bond between the material discharged from the dispensing device and the deposition region to be bonded with the dispensed materials.

BACKGROUND

As technology has progressed, rapid prototyping methods have been developed for producing 3-D objects with various shapes. These methods shorten the time for manufacturing prototype models and also considerably reduce the labour and time involved in processing. Among the conventional rapid prototyping methods, the fused deposition modeling (FDM) method is relatively easy to master. The FDM method is a continuous repetition of the following processes: heating the material in the main body to make it flowable; discharging the heated material onto a deposition region on a substrate through an opening of the dispense head; and depositing, cooling and solidifying the discharged material. The 3-D object is then produced after printing of multiple layers as described above.

In the conventional FDM methods, the temperature of the material discharged from the printing head and then deposited on the deposition region drops quickly. Sometimes, the material discharged from the printing head cannot adequately bond to the deposited material, or even though they are bonded together, an undesired thermal stress remains in the printed 3-D object. In addition, the material may stick to the passage of the dispense head and thus hinder the feeding or discharging of the material. Based on the above, while the conventional FDM methods are generally adequate for producing a 3-D model, they have not been satisfactory in every respect.

SUMMARY OF THE INVENTION

In view of the deficiencies of the conventional techniques, the present disclosure provides a dispensing device for dispensing a thermoplastic material in a 3-D printing process, a 3-D printing apparatus and a method of printing a 3-D object.

The dispensing device according to an embodiment of the present disclosure comprises a main body with a main body heater, a head portion and a heating device. The main body includes a passage with a longitudinal axis and the main body heater is used for heating the material in at least a section of the passage to a flowable condition. The head portion is connected to an end of the passage and communicates with the passage and further includes an outlet for discharging the heated material. The heating device includes a peripheral path surrounding the head portion and heats a region surrounded by the peripheral path.

In one aspect, the heating device is below the main body and spaced from the head portion and the main body heater.

In another aspect, the thermoplastic material is inflammable.

In another aspect, the peripheral path of the heating device has a shape with a long axis and a short axis perpendicular to the long axis, and wherein one side of the heating device along the long axis is closer to the head portion than the other side of the heating device along the long axis is to the head portion.

In another aspect, the heating device comprises at least two segments along the peripheral path, and wherein the at least two segments are independently controlled to respectively provide heating energy.

In another aspect, the heating device has an upper portion and a lower portion along the longitudinal axis of the main body, and wherein the upper portion and the lower portion are independently controlled to respectively provide heating energy.

In another aspect, the heating device has an inner part surrounding the head portion and an outer part surrounding the inner part, and the inner part and the outer part are independently controlled to respectively provide heating energy.

In another aspect, the heating source of the heating device is selected from at least one of a halogen light tube, an infrared light tube, a far-infrared light tube, a quartz heating tube, an ultrasonic heating source, a microwave heating source, a resistive heating plate, an arc lamp tube, a xenon light tube and a laser heating source.

The 3-D printing apparatus according to an embodiment of the present disclosure comprises a table supporting a substrate, a dispensing device according to the present disclosure and a 3-dimensional displacement assembly. The 3-D printing apparatus is used for dispensing a thermoplastic material by the dispensing device on the substrate so as to print a 3-dimensional object.

The method of printing a 3-D object by a dispensing device according to an embodiment of the present disclosure includes controlling the heating device to heat a region above a substrate; feeding the material into the passage of the main body; heating the material in a section of the main body to a flowable condition by the main body heater; discharging the heated material from an outlet of the head portion; and depositing the discharged material onto the substrate in the region heated by the heating device.

In one aspect, the method includes respectively controlling at least two segments of the heating device to provide first heating energy and second heating energy. The segments are arranged along the peripheral path of the heating device. The first heating energy is lower than the second heating energy. Thus, the bond between the material and the deposition area in a first region heated by the first heating energy is weaker than the bond between the material and the deposition area in a second region heated by the second heating energy.

In another aspect, the method includes independently controlling an upper portion and a lower portion of the heating device to respectively heat the discharged material and the deposition area. The upper portion and the lower portion are arranged along the longitudinal axis of the main body.

In another aspect, the method includes independently controlling an inner part and an outer part of the heating device to respectively heat the head portion and the deposition area between the inner part and the outer part. The inner part surrounds the head portion of the dispensing device and the outer part surrounds the inner part.

Based on the present disclosure, the material discharged from the dispensing device may be maintained at an appropriate temperature for bonding with the deposition area and preventing the material from sticking in the passage of the heating device. On the other hand, the deposition area may be pre-heated to an appropriate temperature for bonding with the discharged material. Thus, a strong bond and a rigid structure of the printed 3-D object can be achieved. Still, the heating device may provide different heating energy along the peripheral path of the heating device, the longitudinal axis of the main body or a radial direction with respect to the head portion. As a consequence, the temperatures of the deposition area and the discharged material can be independently controlled according to the needs in the operation of 3-D printing. Moreover, the dispensing device may achieve the outstanding effects of the present disclosure with much lower equipment cost and energy consumption because the heating device is used to heat a localized region only. In addition, the heating device of the present disclosure may easily adapt to different dispensing devices due to the independence between the heating device and the main body.

The above summary is not intended to describe each disclosed embodiment or every implementation of the present invention. The figures and the detailed description below particularly exemplify the illustrative embodiments.

BRIEF DESCRIPTION OF THE DRAWINGS

Aspects of the present disclosure are best understood from the following detailed description when read with the accompanying FIGS. 1-15. It is noted that, in accordance with the standard practice in the industry, various features are not drawn to scale. In fact, the dimensions of the various features may be arbitrarily increased or reduced for clarity of discussion

FIG. 3 illustrates a side view of the dispensing device according to an embodiment of the present disclosure;

FIG. 4 illustrates a bottom view of the dispensing device according to an embodiment of the present disclosure;

FIG. 5 illustrates a perspective view of the dispensing device according to another embodiment of the present disclosure;

DETAILED DESCRIPTION OF THE EMBODIMENTS

Figure 1:
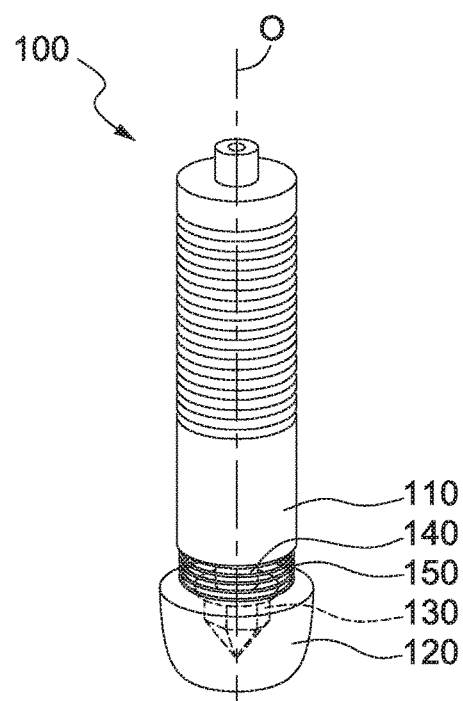
FIG. 1 illustrates a perspective view of the dispensing device according to an embodiment of the present disclosure.

In the following disclosure, reference is made to the accompanying drawings. It is to be understood that other embodiments are contemplated and may be made without departing from the scope or spirit of the present disclosure. The following detailed description is to better illustrate the invention instead of limiting the invention to the following description. Any alterations or modifications of the disclosed embodiments, and any further applications of the principles disclosed in this document are contemplated as would normally occur to one of ordinary skill in the pertinent art. In addition, the present disclosure may repeat reference numerals and/or letters in the various examples. This repetition is for the purpose of simplicity and clarity and does not in itself dictate a relationship between the various embodiments and/or configurations discussed.

Figure 2:
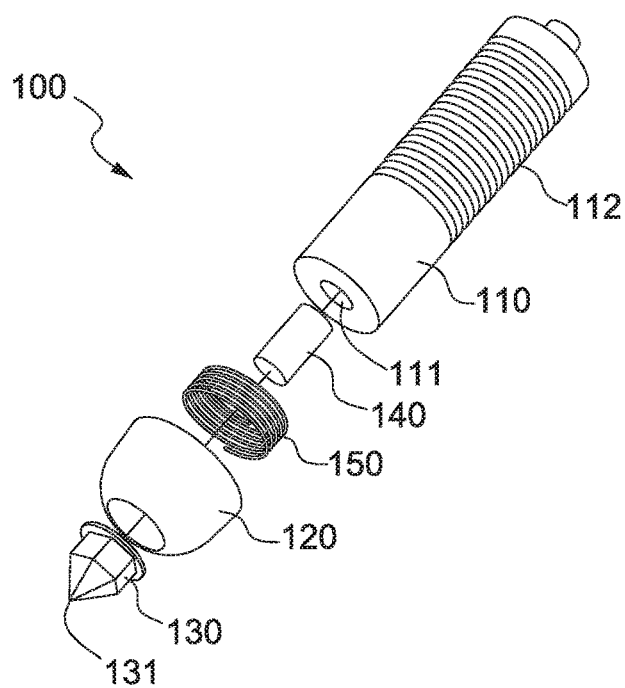
FIG. 2 illustrates an exploded view of the dispensing device according to an embodiment of the present disclosure.

FIG. 1 is a perspective view showing a dispensing device 100 of a 3D printing apparatus according to one embodiment of the present invention. FIG. 2 illustrates an exploded view of the dispensing device 100 in FIG. 1. The dispensing device 100 comprises a main body 110, a head portion 130 for discharging a material which is used to form the 3-D object, and a heating device 120. The main body 110 includes a passage 111 with a longitudinal axis (denoted with "O") and a main body heater (not shown in the drawings) for heating the thermoplastic material in at least a section of the passage to a flowable condition. The heating device 120 is to pre-heat the area onto which the material is about to be dispensed and deposited and may also slow down the temperature drop of the material discharged from the head portion 130.

As shown in FIGS. 1 and 2, a throat 140 is disposed between the head portion 130 and the main body 110 in such a manner that an outlet 131 is in communication with the passage 111 of the main body 110. The throat 140 serves as a connection between the head portion 130 and the main body 110. Preferably, the throat 140 is made from or coated by an anti-stick material, such as Teflon, to reduce the resistance to the feeding of materials and prevent the materials from being stuck to the passage 111 of the heating device. The head portion of the present disclosure can also be connected to the main body without any throat as illustrated in the drawings.

FIG. 3 illustrates a side view of the dispensing device 100 during the operation of 3-D printing and FIG. 4 shows a bottom view of the dispensing device 100. The heating device 120 has a peripheral path disposed below the main body 110 for heating a region 163 surrounded by the peripheral path of the heating device 120 and a space below the region 163. In the embodiment shown in FIGS. 3 and 4, the peripheral path (i.e., the hatched portion) of the heating device 120 is circular. Nevertheless, the peripheral path of the present disclosure may be designed with different shapes. In addition, the bottom surface 121 of the heating device 120 is flush with the outlet 131 of the head portion 130 so that the outlet 131 of the head portion 130 may be positioned close enough to the deposition area of the substrate 161.

The deposition area in the present disclosure is used to represent the areas where the materials are to be deposited. As shown in FIG. 3, the deposition area is the top surface of the substrate 161. The deposition area in the present disclosure may also represent the surface of the solidified materials previously deposited or the supporting material which is commonly used in 3-D printing for supporting the structure before the dispensed materials are solidified.

In a preferred embodiment, the heating device 120 has a heating source which provides heating energy mainly through radiation. Examples of such a heating source include: a halogen light tube, an infrared light tube, a far-infrared light tube, a quartz heating tube, an ultrasonic heating source, a microwave heating source, a resistive heating plate, an arc lamp tube, a xenon light tube and a laser heating source. Through radiation, the heating energy can be transmitted very fast and thus efficiently from the heating device 120 to the region 163 surrounded by the heating device and the space below the region 163.

Figure 15:
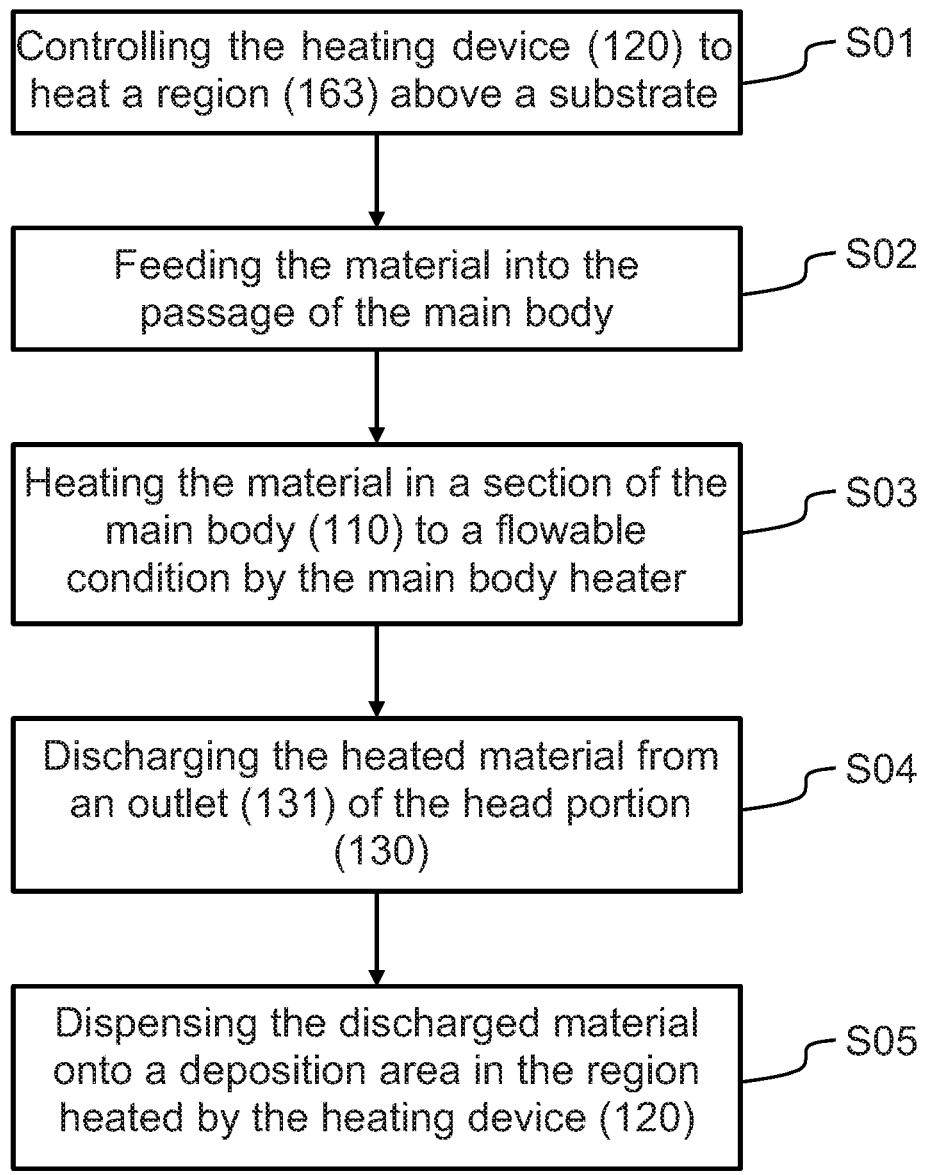
FIG. 15 illustrates a flow chart of a method of printing a 3-D object according to an embodiment of the present disclosure.

Referring now to FIG. 15 and FIG. 3, an embodiment of the operation of 3-D printing with the dispensing device of the present disclosure is explained as follows. In step S01, the heating device 120 is controlled to provide heating energy to the region surrounded by the heating device 120 and the space 163 above the substrate 161. The region and the space 163 are thus heated to a predetermined temperature for achieving an appropriate bond between the substrate 161 (deposition area) and the materials discharged from the dispensing device 100 as described hereinafter. In step S02, a thermoplastic material to be printed, such as in the form of a solid filament, is fed into the passage 111 of the dispensing device 100. Then, in step S03, the main body heater heats the thermoplastic material in a section of the passage 111. The thermoplastic material is heated to a flowable condition and transported to the head portion 130. The heated material is then discharged through the outlet 131 of the head portion 130 in step S04. In step S05, the discharged material (i.e. the material to be dispensed) as described in step S04 is dispensed onto the substrate 161 (deposition area) within the space 163 previously heated by the heating device 120 as described in step S01. The 3-D printing operation as described above is continuously repeated to pre-heat the dispensed material 162 and dispense the material which has been heated in the main body 110 at least partly onto the dispensed material 162 to construct a 3-D object one layer after another.

The heating device 120 helps to maintain the material, which has been heated by the main body 110 and has flowed to the region surrounded by the heating device 120 or the space 163 below the region, at an appropriate temperature and in a flowable condition when it is fed into the head portion 130, discharged from the outlet 131 of the head portion 130 and dispensed onto the substrate 161. On the other hand, the substrate 161 or the dispensed material 162 on the substrate 161 can also be pre-heated by the heating device 120. As a result, the temperature of the material to be dispensed and the temperature of the dispensed material 162 or the substrate 161 are kept similar to each other, so that the material to be dispensed and the dispensed material 162 or the substrate 161 will be well bonded and the thermal stresses therebetween can be reduced.

Although FIG. 15 shows a process in a successive order and starting from step S01, such disclosure is not intended to be limiting. Rather, persons of ordinary skill may clearly understand that step S01 may be implemented at the same time with any of steps S01 to S05. For example, the heating device 120 may be controlled to heat the region 163 (S01) at the same time when the material is fed into the passage 111 of the main body 110 (S02), heated by the main body heater (S03), discharged through the outlet 131 (S04) and/or deposited onto the substrate 161 or the dispensed material 162 as long as the material to be dispensed, the region surrounded by the heating device and the space 163 below the region can be maintained at an appropriate temperature for bonding.

In view of the above, the dispensing device of the present disclosure is beneficial, but not limited, to be used in printing a 3-D object with inflammable materials, such as polycarbonate, polyetherimide, polysulfone, polyethersulfone, amorphous polyamides, etc. Since the temperature of the deposited inflammable material on the substrate generally drops faster, it is difficult for conventional techniques to optimize the bonding effect. By virtue of the heating device 120, the present disclosure resolves the problem with the difficulty in optimizing the bonding effect between the inflammable material layers dispensed during a 3-D printing process.

Another preferred embodiment, as shown in FIGS. 2 and 3, is to arrange a spring 150 between the heating device 120 and the main body 110. The spring 150 serves as a shock absorber to prevent the dispensing device 100 from causing damage to the deposition area or surrounding components as the dispensing device moves relative to the substrate. Although the spring 150 is connected to the heating device 120 and the main body 110, the heating device 120 is substantially isolated and spaced from the main body 110. That is to say, the heating energy of the heating device 120 and the main body 110 do not substantially affect each other.

While the present embodiment provides a spring 150, the heating device 120 can alternatively be connected to the main body 110 or other components of the 3-D printing apparatus with other connecting elements as long as the heating device is isolated and spaced from the main body 110. By virtue of the isolation and spacing of the heating device from the main body, the heating energy of the heating device and the main body do not adversely affect each other. As a consequence, the heating energy provided by the heating device as described above and the heating energy provided by the main body heater can be independently controlled to satisfy different needs.

The heating device 120 may be not easily detachable from the dispensing device 100 after assembly; alternatively, the heating device 120 may be separable from the dispensing device 100. For example, the heating device 120 can be fixedly connected to the dispensing device 100 by welding or adhering such that it is not easy to detach from the heating device 120. On the other hand, the heating device 120 can be removably attached to the main body 110 or other elements of the dispensing device 100 through appropriate fastening means, such as clamping holders. In this case, the heating device 120 can be easily attached to or removed from different dispensing devices as needed.

Figure 6:
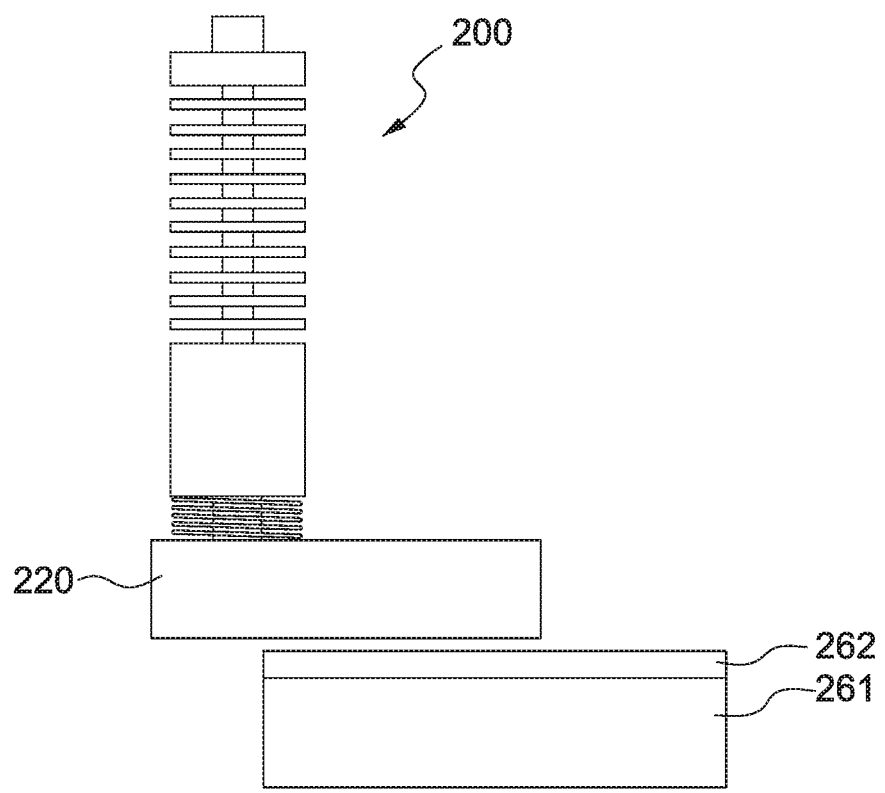
FIG. 6 illustrates a side view of the dispensing device shown in FIG. 5.
Figure 7:
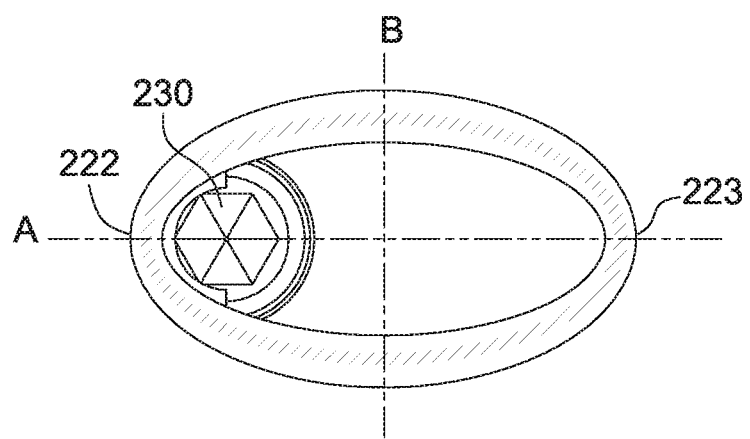
FIG. 7 illustrates a bottom view of the dispensing device shown in FIG. 5.

FIGS. 5-7 illustrate another preferred embodiment; a dispensing device 200 is shown in a perspective view, side view and bottom view, respectively. The dispensing device 200 has a heating device 220 with an elliptical peripheral path surrounding the head portion 130. The elliptical peripheral path has a long axis (A) and a short axis (B) perpendicular to the long axis. One end 222 of the heating device 220 along the long axis (A) is closer to the head portion 230 than the other end 223 is to the head portion.

In this embodiment, the region surrounded by the peripheral path of the heating device 220 is larger than the head portion 230. Thus, as shown in FIG. 6, a larger area of the dispensed material 262 (the deposition area) may be pre-heated by the heating device 220. In this case, the dispensed material 262 can be sufficiently pre-heated to an appropriate temperature before the head portion 230 moves to the right in FIG. 6 and arrives at the pre-heated deposition area.

Figure 8:
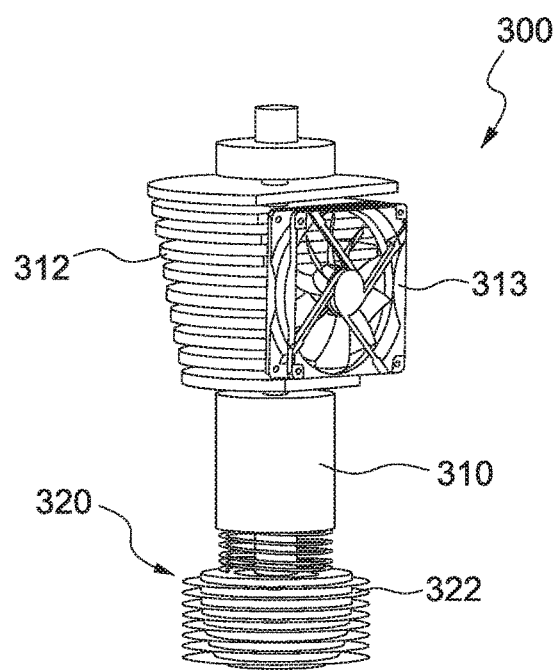
FIG. 8 illustrates a perspective view of the dispensing device according to another embodiment of the present disclosure.

FIG. 8 illustrates a perspective view of another embodiment of the dispensing device 300. The heating device 320 has fins 322 arranged on the outer surface of the heating device 320 for cooling the heating device 320 so as to prevent it from overheating. On the other hand, the main body 310 has fins 312 on the outer surface of the main body 310 and a fan 313 can be further set coupled to the fins 312 to facilitate heat dissipation. Since the heat dissipating components (the fins 322) of the heating device 320 are separated and isolated from the heat dissipating components (the fins 312 and fan 313) of the main body 310, the heat dissipated by the heating device 320 does not adversely affect the main body 310. Likewise, the heating device is spaced and isolated from the main body heater so that the heat generated by the heating device does not adversely affect the main body. Otherwise, if the heat dissipating component of the heating device were coupled to the head portion of the main body, an undesired condition might occur in which the material in the head portion becomes solidified and stuck in the head portion. In addition, if the heating energy provided by the heating device 320 were transmitted to the main body 310, the solid material in the main body 310 might be heated to a flowable condition and be adversely affected before arriving at the section where the solid material is to be heated by the main body heater. Therefore, by means of isolating and spacing the heat generating components and also isolating and spacing the heat dissipating components, better maneuverability and higher accuracy in controlling temperature in local regions can be achieved.

Figure 9:
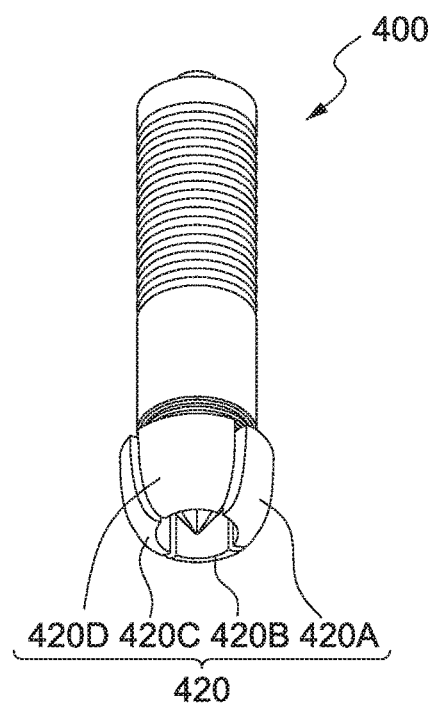
FIG. 9 illustrates a perspective view of the dispensing device according to another embodiment of the present disclosure.
Figure 10:
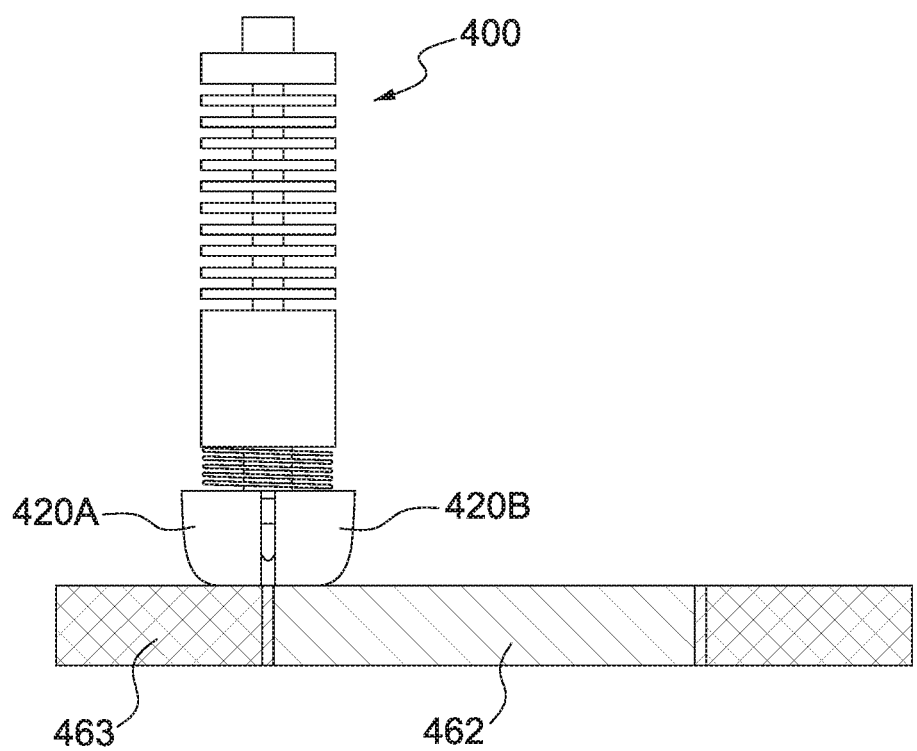
FIG. 10 illustrates a side view of the dispensing device shown in FIG. 9.

FIGS. 9 and 10 illustrate another embodiment, wherein a perspective view and a side view of the dispensing device 400 are shown, respectively. The heating device 420 of the dispensing device comprises four segments 420A-420D arranged along the peripheral path of the heating device 420. The four segments 420A-420D can be independently controlled to respectively provide heating energy. For example, the segments 420A and 420D may be controlled to provide lower heating energy compared to that provided by the segments 420B and 420C. As a result, the heating device 420 generates higher heating energy at one side (the segments 420B and 420C) and lower heating energy at the other side (the segments 420A and 420D).

Such arrangement of the heating device 420 shown in FIGS. 9 and 10 is advantageous when different bonding strengths are required in printing a 3-D object. In particular, sometimes, part of the dispensed material forms a supporting portion for reinforcing the structure and/or facilitating manufacturing. The supporting portion is generally removed after the dispensed material is solidified and rigid enough to sustain its own structure; to facilitate the removal of the supporting portion. Thus, it is beneficial to have a relatively low bonding strength at the supporting portion or at the boundary between the supporting portion and the other dispensed materials. Nevertheless, a strong bond is always necessary between different layers of the dispensed materials for achieving a rigid 3-D object. In this case, as the dispensing device 400 in FIG. 10 is moving along the boundary between the supporting portion 463 and the dispensed materials 462 to be maintained during the printing process, the segments 420A and 420D (the segments at the left side in FIG. 10) are controlled to provide heating energy lower than that provided by the segments 420B and 420C (the segments at the right side in FIG. 10). As a result, the supporting portion 463 is always maintained at a relatively low temperature for forming a relatively weak bond with the dispensed material. On the other hand, the dispensed material 462 to be maintained in the 3-D object is always maintained at a relatively high temperature such that a rigid structure of the 3-D object with a strong bond can be accomplished. In this case, the supporting portion 463 can be easily separated from the 3-D object after the 3-D printing process. Although the above describes a moving direction of the dispensing device 400 along the boundary between the supporting portion 463 and the dispensed materials 462, the dispensing device 400 can be controlled to move in other directions according to the needs and designs of the 3-D object and the segments 420A-420D can be controlled to achieve a relatively weak bond between the dispensed material and the supporting portion 463 and a strong bond between different layers of dispensed material.

Figure 11:
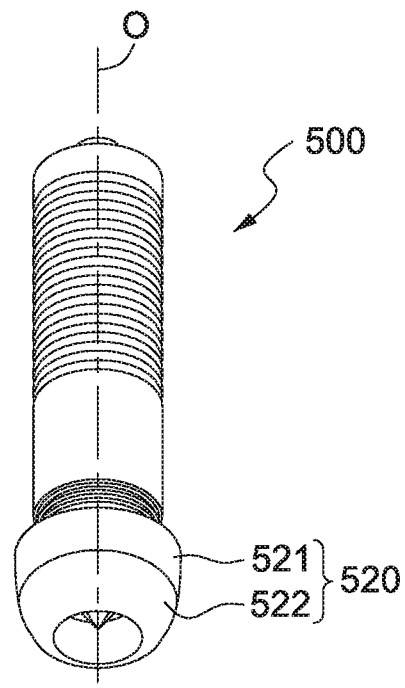
FIG. 11 illustrates a perspective view of the dispensing device according to another embodiment of the present disclosure.

FIG. 11 illustrates a perspective view of another embodiment of the dispensing device 500. The heating device 520 of the dispensing device 500 has an upper portion 521 and a lower portion 522 below the upper portion 521. The upper portion 521 and the lower portion 522 are arranged along the longitudinal axis (O). The upper portion 521 and the lower portion 522 may be independently controlled to respectively provide heating energy. Thus, the two sections respectively surrounded by the upper and lower portions 521 and 522 can be maintained at different temperatures according to actual needs during the operation of 3-D printing. For example, the upper portion 521 may be controlled to provide lower heating energy to remove water from the materials in the head portion 130 or the throat 140 and the lower portion 522 may be controlled to provide higher heating energy to enhance the flowability of the dispensed material. Thereby, the material sustains a high temperature for only a short time so that the high temperature does not adversely affect the material.

Figure 12:
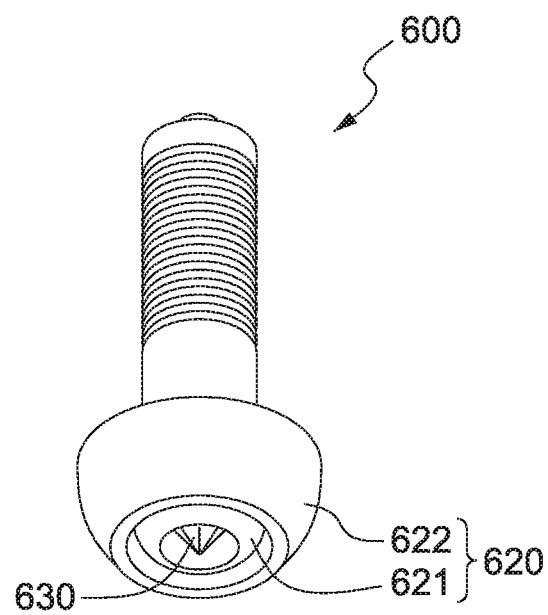
FIG. 12 illustrates a perspective view of the dispensing device according to another embodiment of the present disclosure.
Figure 13:
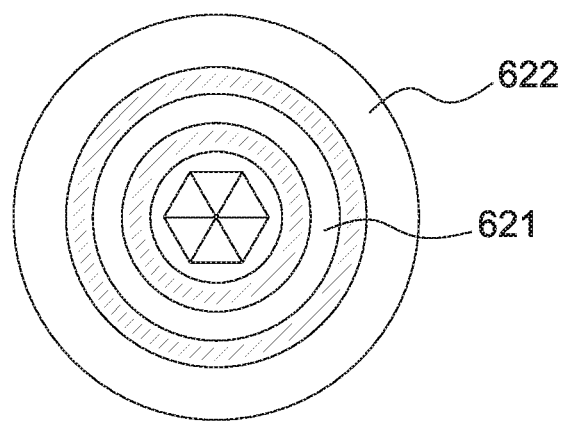
FIG. 13 illustrates a bottom view of the dispensing device shown in FIG. 12.

In FIGS. 12 and 13, another embodiment of the dispensing device 600 is provided. The heating device 620 of the dispensing device 600 includes an inner part 621 surrounding the head portion 630 and an outer part 622 surrounding the inner part 621. The inner and outer parts 621 and 622 may be independently controlled to respectively provide heating energy. For example, the inner part 621 may be controlled to provide higher heating energy to keep the material in the head portion 630 flowable and the outer part 622 may be controlled to provide lower heating energy to keep the deposition area at an appropriate temperature for bonding with the dispensed material. In this case, the materials of the deposition area do not need to be maintained at a high temperature for a long time.

Figure 14:
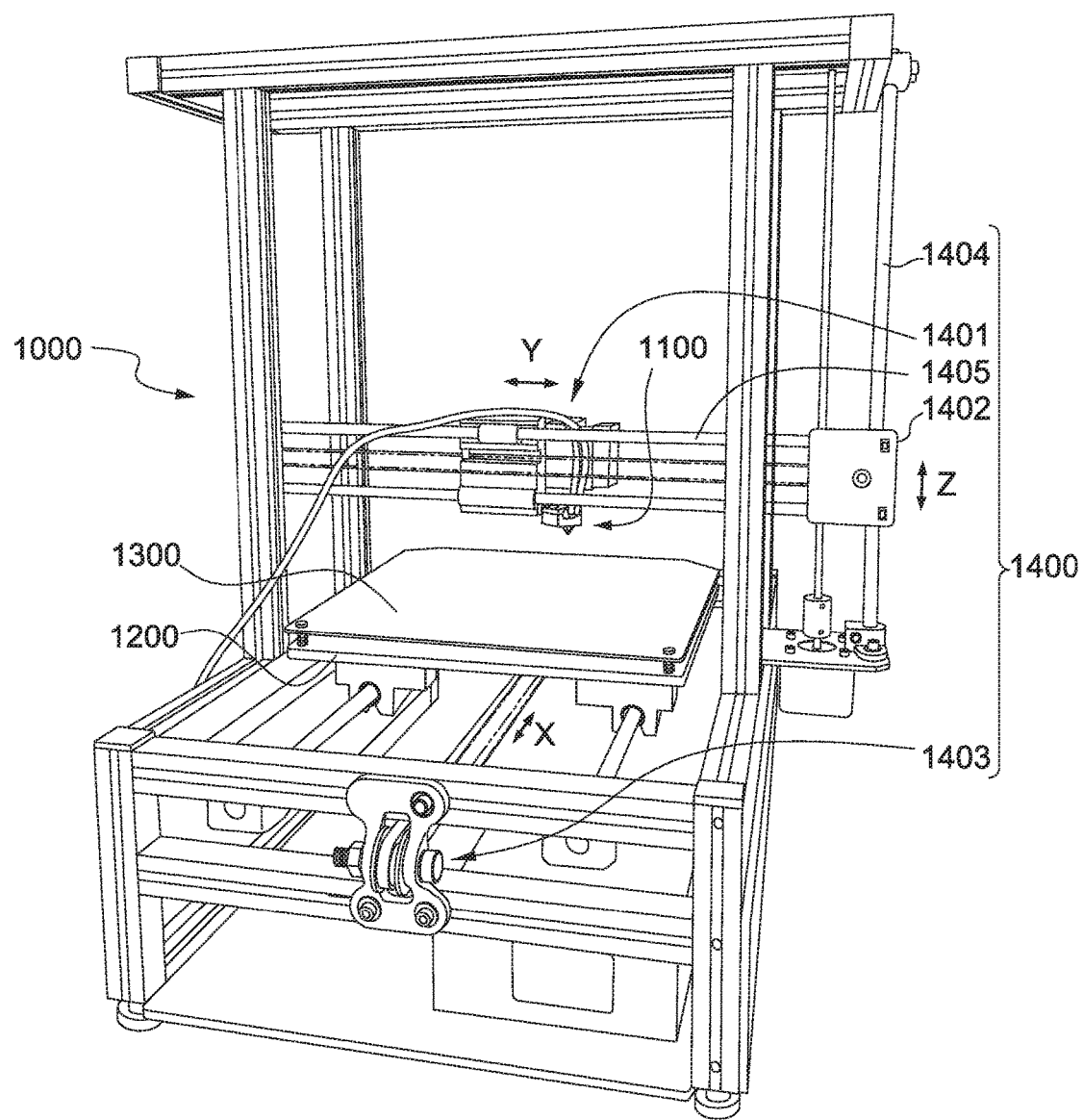
FIG. 14 illustrates a 3-D printing apparatus according to an embodiment of the present disclosure.

FIG. 14 illustrates an embodiment of the 3-D printing apparatus 1000 according to the present disclosure. The 3-D printing apparatus 1000 includes a dispensing device 1100 of the present disclosure, a table 1200, a substrate 1300 and a 3-D displacement assembly 1400. The dispensing device 1100 is operated to print a 3-D model on the substrate 1300. The substrate 1300 is supported and carried by the table 1200. The 3-D displacement assembly 1400 includes an X-displacement unit 1403, a Y-displacement unit 1401 and a Z-displacement unit 1402. The X-displacement unit 1403 includes a transporting mechanism for moving the table 1200 and the substrate 1300 in the X direction. The Y-displacement unit 1401 is used for carrying and moving the dispensing device 1100 along the Y-direction rail 1405 in the Y direction. The Z-displacement unit 1402 is used for carrying and moving the Y-direction rail 1405 along the Z-direction rail 1404 in the Z direction. By virtue of the 3-D displacement assembly 1400, the position of the dispensing device 1100 with respect to the substrate 1300 can be changed so that materials can be discharged at each of predetermined locations and thus dispensed onto specific deposition areas above the substrate 1300.

Based on the above, the present disclosure provides a dispensing device for dispensing a thermoplastic material and printing a 3-D object. The dispensing device includes a main body with a main body heater, a head portion and a heating device with a peripheral path surrounding the head portion. The heating device is arranged below the main body and spaced from the head portion and the main body heater. Thus, the heating device and the main body heater can be independently controlled to respectively provide heating energy and without adversely affecting each other. By means of the heating device, the temperatures of the material discharged by the head portion and the deposition area can be independently controlled to achieve an appropriate bond according to the requirements in printing the 3-D object. In addition, the heating device is made to prevent the material from sticking in the passage of the main body. Further, as the heating device according to some embodiments of the present disclosure is located below the main body and surrounds the head portion, such localized heating device has a relatively small volume and thus saves the equipment cost and the energy consumption. Moreover, in view of the independence between the heating device and the main body, the heating device of the present disclosure may be easily assembled and disassembled with different dispensing devices.

Although the present disclosure has been described in relation to particular embodiments thereof, many other variations and modifications and other uses may become apparent to those skilled in the art. For example, persons of ordinary skill would clearly understand that the heating device of the present disclosure may include any combinations selected from the segments 420A-420D, the upper and lower portions 521 and 522, and the inner and outer parts 621 and 622. It is preferred, therefore, that the present invention be limited not by the specific descriptions herein, but only by the appended claims.

What is claimed is:

1. A dispensing device, comprising:
   a main body including a passage with a longitudinal axis;
   a main body heater configured to heat a material in at least a section of the passage to a determined temperature;
   a head portion at an end of the passage, wherein
     the head portion communicates with the passage, and
     the head portion has an outlet to discharge the heated material; and
   a heating device that comprises a peripheral path, wherein
     the peripheral path surrounds the head portion, wherein
     the heating device is configured to heat a region that covers the outlet, and wherein region is surrounded by the peripheral path.

2. The dispensing device according to claim 1, wherein the heating device is spaced apart from the head portion and the main body heater, and wherein the heating device is below the main body.

3. The dispensing device according to claim 1, wherein the heating device is removably attached to the dispensing device.

4. The dispensing device according to claim 1,
   wherein the peripheral path of the heating device has a shape with a first axis and a second axis perpendicular to the first axis,
   wherein the first axis is longer than the second axis, and
   wherein a first side of the heating device along the first axis is closer to the head portion than a second side of the heating device.

5. The dispensing device according to claim 1,
   wherein the heating device comprises a plurality of segments along the peripheral path, and
   wherein the plurality of segments is independently controlled to heat the region.

6. The dispensing device according to claim 1,
   wherein the heating device has an upper portion and a lower portion along the longitudinal axis, and
   wherein the upper portion and the lower portion are configured to independently controlled to heat the region.

7. The dispensing device according to claim 1,
   wherein the heating device has an inner part surrounding the head portion and an outer part surrounding the inner part, and
   wherein the inner part and the outer part are independently controlled to heat the region.

8. The dispensing device according to claim 1, wherein a heating source of the heating device is at least one of a halogen light tube, an infrared light tube, a far-infrared light tube, a quartz heating tube, an ultrasonic heating source, a microwave heating source, a resistive heating plate, an arc lamp tube, a xenon light tube, or a laser heating source.

9. An apparatus, comprising:
   a table configured to support a substrate;
   a dispensing device configured to dispense a thermoplastic material to print a 3-dimensional object on the substrate, wherein the dispensing device comprises:
     a main body including a passage with a longitudinal axis;
     a main body heater configured to heat a material in at least a section of the passage to a determined temperature;
     a head portion at an end of the passage, wherein
       the head portion communicates with the passage, and
       the head portion has an outlet to discharge the heated material; and
     a heating device that comprises a peripheral path surrounding the head portion, wherein the heating device is configured to heat a region that covers the outlet, and wherein region is surrounded by the peripheral path; and
   a 3-dimensional displacement assembly configured to change a position of the dispensing device relative to the substrate.

10. The apparatus according to claim 9, wherein the heating device is spaced apart from the head portion and the main body heater, and wherein the heating device is below the main body.

11. The apparatus according to claim 9, wherein the heating device is removably attached to the dispensing device.

12. The apparatus according to claim 9,
    wherein the peripheral path of the heating device has a shape with a first axis and a second axis perpendicular to the first axis,
    wherein the first axis is longer than the second axis, and
    wherein a first side of the heating device along the first axis is closer to the head portion than a second side of the heating device.

13. The apparatus according to claim 9,
    wherein the heating device comprises a plurality of segments along the peripheral path, and wherein the plurality of segments is independently controlled to heat the region.

14. The apparatus according to claim 9,
wherein the heating device has an upper portion and a lower portion along the longitudinal axis, and
wherein the upper portion and the lower portion are independently controlled to heat the region.

15. The apparatus according to claim 9,
wherein the heating device has an inner part surrounding the head portion and an outer part surrounding the inner part, and
wherein the inner part and the outer part are independently controlled to heat the region.

16. The apparatus according to claim 9, wherein a heating source of the heating device is at least one of a halogen light tube, an infrared light tube, a far-infrared light tube, a quartz heating tube, an ultrasonic heating source, a microwave heating source, a resistive heating plate, an arc lamp tube, a xenon light tube, or a laser heating source.

* * * * *